US011885484B1

(12) United States Patent
King

(10) Patent No.: US 11,885,484 B1
(45) Date of Patent: Jan. 30, 2024

(54) ILLUMINATION

(71) Applicant: BDZ Investments Ltd, Newbury (GB)

(72) Inventor: John Bernard King, Newbury (GB)

(73) Assignee: BDZ INVESTMENTS LTD, Newbury (GB)

( * ) Notice: Subject to any disclaimer, the term of this patent is extended or adjusted under 35 U.S.C. 154(b) by 0 days.

(21) Appl. No.: 17/937,040

(22) Filed: Sep. 30, 2022

Related U.S. Application Data

(63) Continuation-in-part of application No. 17/265,033, filed as application No. PCT/GB2019/000109 on Aug. 2, 2019, now Pat. No. 11,486,552.

(30) Foreign Application Priority Data

Aug. 2, 2018 (GB) ...................................... 1812623

(51) Int. Cl.
*F21V 23/06* (2006.01)
*F21L 4/00* (2006.01)

(52) U.S. Cl.
CPC .............. *F21V 23/06* (2013.01); *F21L 4/005* (2013.01)

(58) Field of Classification Search
CPC ... F21L 17/00; F21L 4/00; B65Q 7/00; B65D 83/00
See application file for complete search history.

(56) References Cited

U.S. PATENT DOCUMENTS

| | | | |
|---|---|---|---|
| 4,827,245 | A | 5/1989 | Lipman |
| 7,106,179 | B1 | 9/2006 | Dueker et al. |
| 8,348,464 | B2 | 1/2013 | McDermott |
| 10,180,244 | B2 | 1/2019 | Stamatatos et al. |
| 2012/0287611 | A1 | 11/2012 | Wilson et al. |
| 2014/0126187 | A1 | 5/2014 | Bennett et al. |

FOREIGN PATENT DOCUMENTS

| | | | |
|---|---|---|---|
| CN | 102934984 | A | 2/2013 |
| WO | 98/38454 | A1 | 9/1998 |

OTHER PUBLICATIONS

Marco Marking Light by blue force gear (https://www.blueforcegear.com/marco), accessed Sep. 18, 2023 (Year: 2023).*

* cited by examiner

*Primary Examiner* — Leah Simone Macchiarolo
(74) *Attorney, Agent, or Firm* — McClure, Qualey & Rodack, LLP

(57) ABSTRACT

A method is described for deploying one or more illumination devices. The or each illumination device is self-contained and has a first state in which it is inoperative and a second state in which it is operative to provide illumination at at least one frequency within the range from and including infrared to and including ultraviolet. The method comprises the steps, optionally repeated at intervals, of: actuating a mechanism to move a said illumination device from a housing storing one or more illumination devices to an exposed position outside the housing; and automatically changing the state of the illumination device from its first state to its second state as a direct result of movement of the illumination device from within the housing to the exposed position.

6 Claims, 14 Drawing Sheets

ILLUMINATION

RELATED APPLICATIONS

This Application is a Continuation-in-Part of U.S. application Ser. No. 17/265,033, which was based upon and claimed the priority of International Application No: PCT/GB2019/000109, which in turn claimed priority from United Kingdom Patent Application No: 1812623.5.

FIELD OF THE DISCLOSURE

This disclosure relates to deployment of illumination devices.

BACKGROUND

Illumination systems for indoor or outdoor use are very well known. Conventional arrangements involve a number of illumination devices, typically electric lights, coupled by electric wiring to a power source, typically mains electric power; and the resultant installations are intended to be at least semi-permanent. The system may be designed to provide illumination per se, as in domestic lighting, or to provide an indication to others, as in the case of beacons marking an aircraft runway.

The present disclosure adopts a fundamentally different approach to the provision of illumination. As will become clear from the description below, illumination apparatus adopting the teachings of the present disclosure is particularly suitable where an external power supply such as mains electricity may not be available or when the installation is intended to be temporary.

Previous attempts to provide temporary illumination have generally been hampered by the portable equipment being bulky and heavy to transport, and by the limitations of the lengths of electric cabling connecting individual illumination devices to an external power source. Chemiluminescent devices which do not require an external power source have also been used for short term temporary illumination. Heretofore, such devices have needed to be individually armed by a user before or during deployment, resulting in time-consuming deployment.

SUMMARY OF THE DISCLOSURE

According to a first aspect of this disclosure, we provide a method of deployment of one or more illumination devices, the or each illumination device being self-contained and having a first state in which it is inoperative and a second state in which it is operative to provide illumination at at least one frequency within the range from and including infrared to and including ultraviolet, the method comprising the steps, optionally repeated at intervals, of: actuating a mechanism to move a said illumination device from a housing storing one or more said illumination devices to an exposed position outside the housing; and automatically changing the state of the said illumination device from its first state to its second state as a direct result of said movement from within the housing to said exposed position.

In accordance with a second and alternative aspect of this disclosure, there is provided an illumination device deployment apparatus comprising: a housing; at least one self-contained illumination device stored within the housing, the illumination device having a first state in which it is inoperative and a second state in which it is operative to provide illumination at at least one frequency within the range from and including infrared to and including ultraviolet, the device being in said first state when within the housing; a moving mechanism adapted to move a said illumination device from within said housing to an exposed position outside the housing requiring illumination; and an arming device associated with the moving mechanism effective to change the state of the illumination device from its first to its second state as a consequence of movement of said illumination device from within the housing to the said exposed position.

In a third alternative aspect of this disclosure , a method is provided for marking a line or laying a trail, the method comprising deploying at intervals, while following the line or trail, which intervals need not be the same, individual self-contained illumination devices from a housing therefor, and automatically arming each such device as it is deployed to provide illumination at at least one frequency within the range from and including infrared to and including ultraviolet.

The term “self-contained” is used throughout this disclosure to refer to illumination devices that incorporate their own power supply and so require no external wiring, or, as in the case of a chemiluminescent device, do not require any power supply.

Preferred embodiments include one or more of the following features: A plurality of essentially identical illumination devices are mounted within a cartridge loaded into said housing, the cartridge being capable of replacement by a fresh cartridge with a further plurality of essentially identical illumination devices mounted therewithin or capable of replenishment with further essentially identical illumination devices. Each illumination device includes its own battery electric supply, and the arming device completes an electric circuit within the device. Alternatively, each illumination device comprises a chemiluminescent device and the arming device removes a barrier between chemical reagents within the device, which reagents when mixed produce light.

In a fourth alternative aspect of this disclosure, an illumination device deployment apparatus comprises: a housing adapted to store a plurality of identical self-contained illumination devices in a stack thereof; the housing being coupled to a dispensing head for dispensing successive illumination devices from the stack through a common passage to the exterior; the dispensing head including a slider adapted, against the bias of a return spring, to push a said illumination device from an end-most position of the stack through said common passage to the exterior; each illumination device having a first pre-operative state in which it is inoperative but ready for use and a second state in which it is operative to provide illumination at at least one frequency within the range from and including infrared to and including ultraviolet, the device being in said first state when within said stack; and the slider, when in contact with an illumination device to push it from the said end-most position through said passage to the exterior, being operative to change the state of the illumination device from its first to its second state.

In preferred embodiments according to this aspect, the illumination device deployment apparatus may have one or more of the following features: The slider includes a metal surface portion adapted to make an electrical connection between two exposed pins on a confronting surface of the illumination device, thereby switching the illumination device on, when the slider makes contact with the illumination device at said end-most position of the stack when pushing it through the passage to the exterior. The apparatus further comprises a bias spring within the housing adapted to urge illumination devices in said stack towards said end-most position in a direction at right angles to the direction of movement of the slider. The apparatus is sized and configured for use in one hand, with that hand grasping the housing about its length while the thumb of that same hand pushes the slider forwardly. The housing is provided with a slidable cover capable of being slid to an open condition to reveal the stack; the bias of the bias spring being transmitted to illumination devices in said stack via a carriage slidable within the housing and operable to engage with the stack it its end opposite said end-most position; the carriage including a projection positioned for contact by a portion of said cover to allow the bias of the bias spring to be disengaged from the stack by holding the slidable cover open, to thereby allow illumination devices to be added to or removed from the stack.

BRIEF DESCRIPTION OF THE DRAWINGS

Reference may be made to the accompanying drawings, which illustrate particular embodiments by way of example only, and in which.

DESCRIPTION OF PREFERRED EMBODIMENTS

Figure 1:
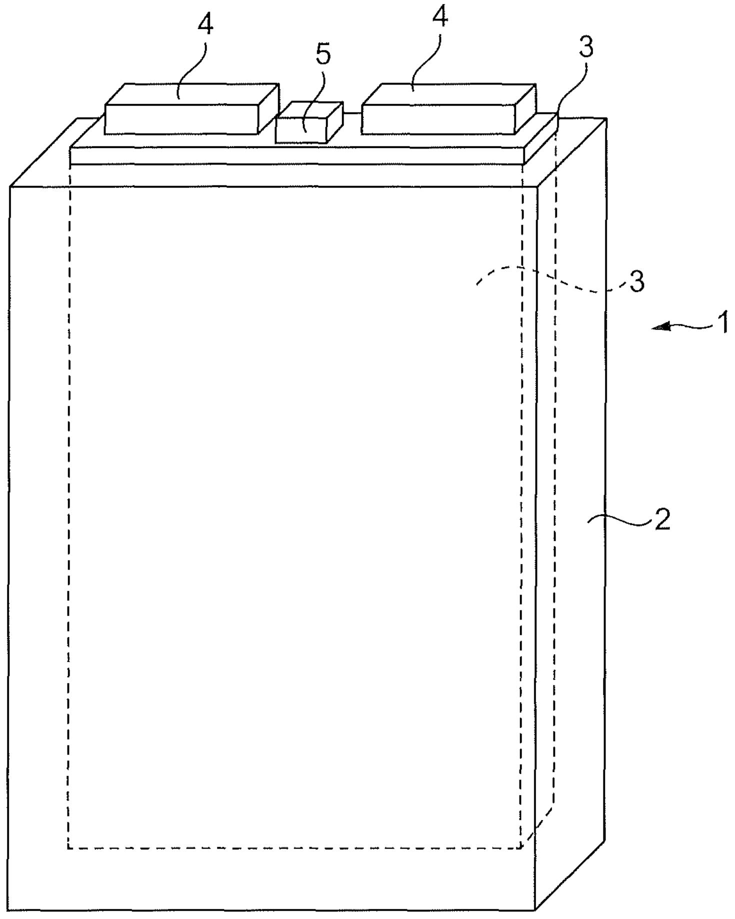
FIG. 1 is a perspective view of a first embodiment of illumination device.

Turning first to FIG. 1, the illustrated illumination device 1 comprises an outer casing 2, within which a printed circuit board (hereafter: PCB) 3 is located, the PCB 3 being provided with a pair of activation contacts 4 and a deactivation contact 5 protruding from one end of the casing 2. Within the casing 2, but not illustrated, is a light source. The light source is suitably one or more light emitting diodes (hereafter: LEDs) or electroluminescent material and is connected in an electric circuit passing through the PCB 3 and including a battery power source within casing 2. Making an electric connection between the two activation contacts activates a switch within the PCB 3 to complete the said electric circuit to power the one or more LEDs. Space within the casing not occupied by the PCB may be filled with glass beads or other refractive materials to spread, concentrate or direct the light output, and the open end of casing 2 adjacent the contacts may be sealed with resin to prevent ingress of moisture. At least an outer wall of the casing may be formed of metal, typically of steel or of aluminium, in which case, the metal casing wall should be pierced by apertures to allow light from the LEDs to shine therethrough. In an alternative arrangement, apart from the portion of the PCB 3 protruding from one end of casing 2, as illustrated in FIG. 1, the casing may encapsulate the PCB as well as the one or more LEDs. To this end the casing may be formed of any clear, translucent or coloured mouldable material such as polyvinyl chloride (hereafter: PVC), polyurethane, resin or glass capable of encapsulating the PCB and one or more LEDs without destroying them.

Although casing 3 is depicted in FIG. 1 as a rectangular cuboid, this is not necessary. The casing may take any suitable geometry provided that the PCB can be encapsulated and light from the LEDs may be transmitted through the casing.

Figure 2:
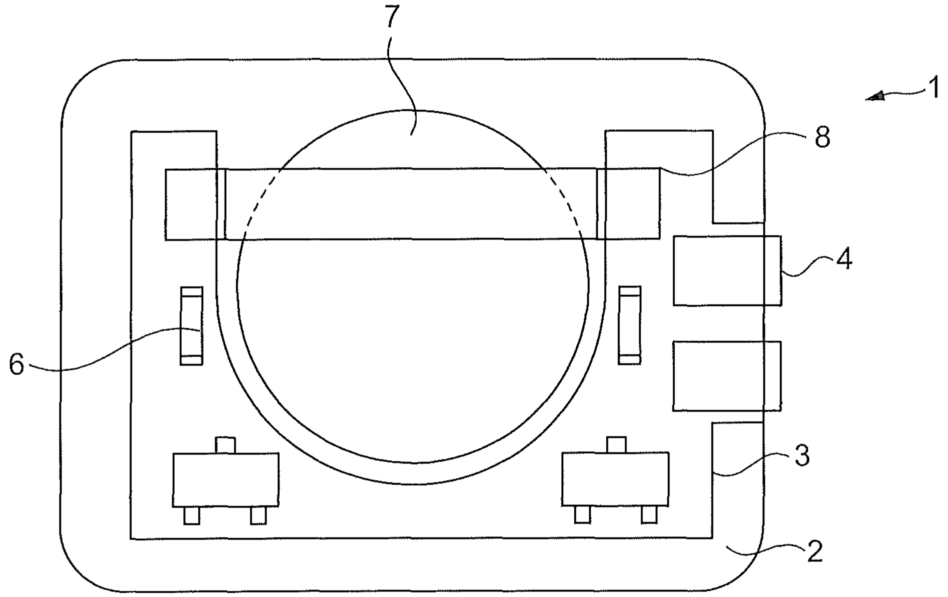
FIG. 2 is a front elevational view of a second embodiment of illumination device.
Figure 3:
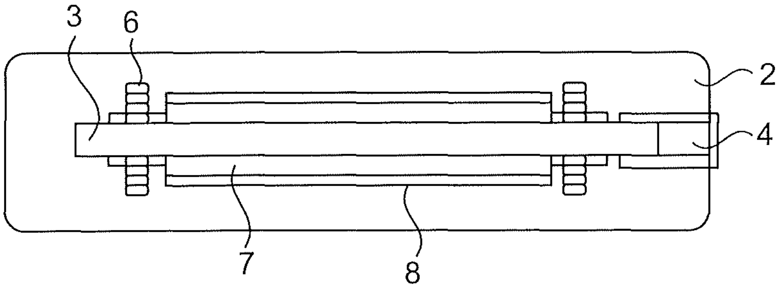
FIG. 3 is a side elevational view of the illumination device of FIG. 2.

FIGS. 2 and 3 show the internal structure of an alternative embodiment of illumination device. Like reference numerals are employed for like parts to those of the FIG. 1 embodiment. Casing 2 is here transparent so that the PCB 3 and LEDs 6, here four in number, can be seen through the casing. Two LEDs are mounted on each side of the illumination device to shine through the encapsulating casing 2, so that it matters not which way up the device sits. A battery, here a so-called watch battery or button cell battery 7, preferably a lithium-metal battery, is held in place by battery clips 8 on both sides of PCB 3. A pair of edge contacts 4 with copper foil rolled over the end extend proud of the encapsulating casing and serve as the activation contacts for the illumination device. The illumination device illustrated in FIGS. 2 and 3 can be manufactured to be relatively small, typically with dimensions of 20 mm×15 mm×5 mm, since the combination of the relatively high charge density provided by a lithium-metal button cell combined with the relatively low power requirements of LEDs, provides a useful life for the device while still providing a useful luminous intensity.

A plurality of illumination devices are preferably mounted in a cartridge which in turn is mounted within a housing, preferably a hand-held housing, from which the devices may be deployed, the housing being openable to exchange cartridges or to replenish the one cartridge.

Figure 4:
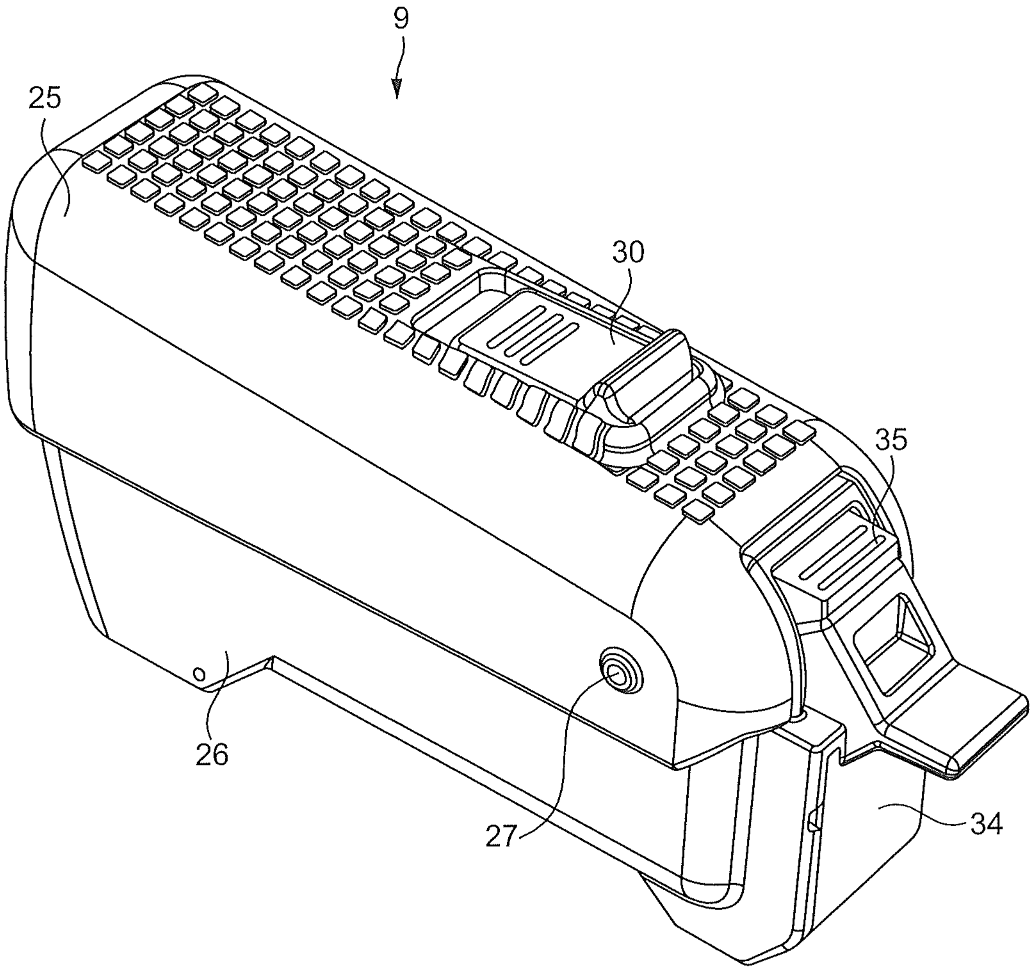
FIG. 4 is a perspective view of an illumination device deployment apparatus.
Figure 5:
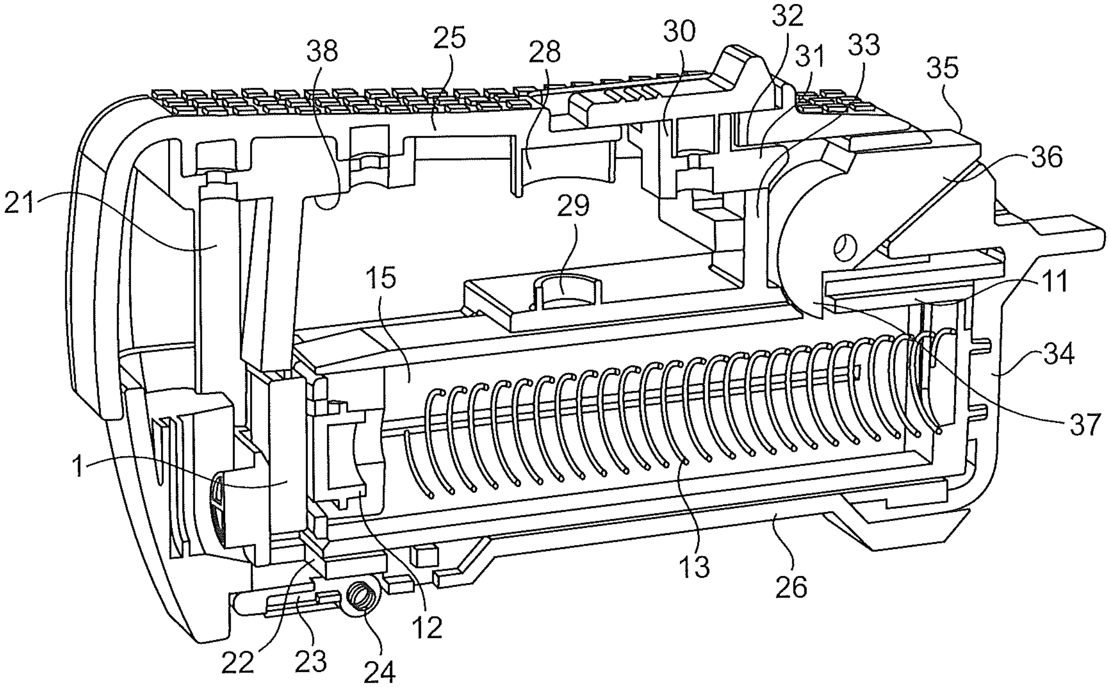
FIG. 5 is a perspective view of the illumination device deployment apparatus of FIG. 4 with parts broken away to show internal structure.
Figure 6:
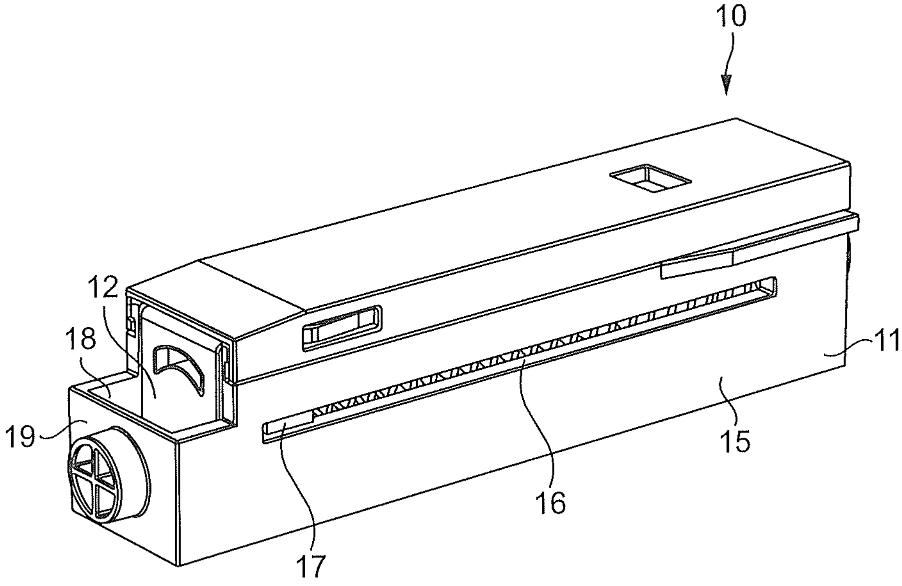
FIG. 6 is a perspective view of a cartridge for illumination devices for the apparatus of FIGS. 4 and 5.
Figure 7:
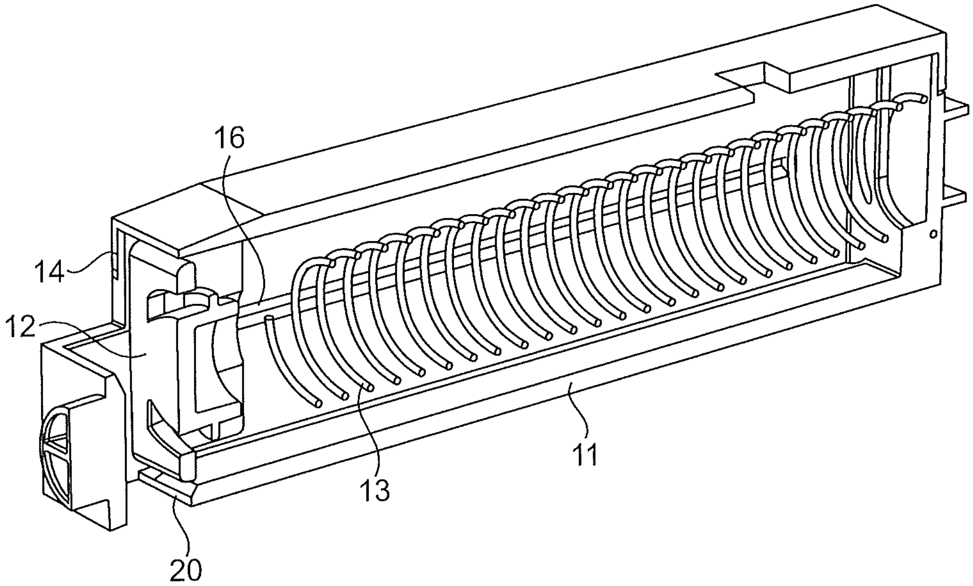
FIG. 7 is a perspective view of the cartridge of FIG. 6 on a smaller scale and partly broken away to show internal structure.

FIGS. 4 and 5 show an exemplary hand-held housing 9 and FIGS. 6 and 7 illustrate an exemplary cartridge 10, but other arrangements will readily occur to a skilled person.

Figure 8:
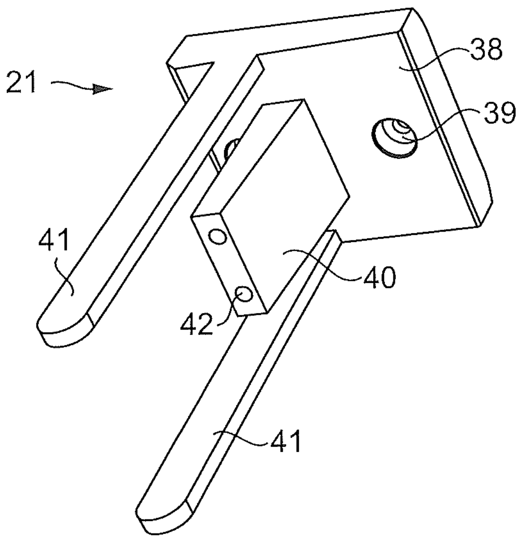
FIG. 8 is an enlarged view of an ejector pin for the apparatus of FIGS. 4 and 5.
Figure 9:
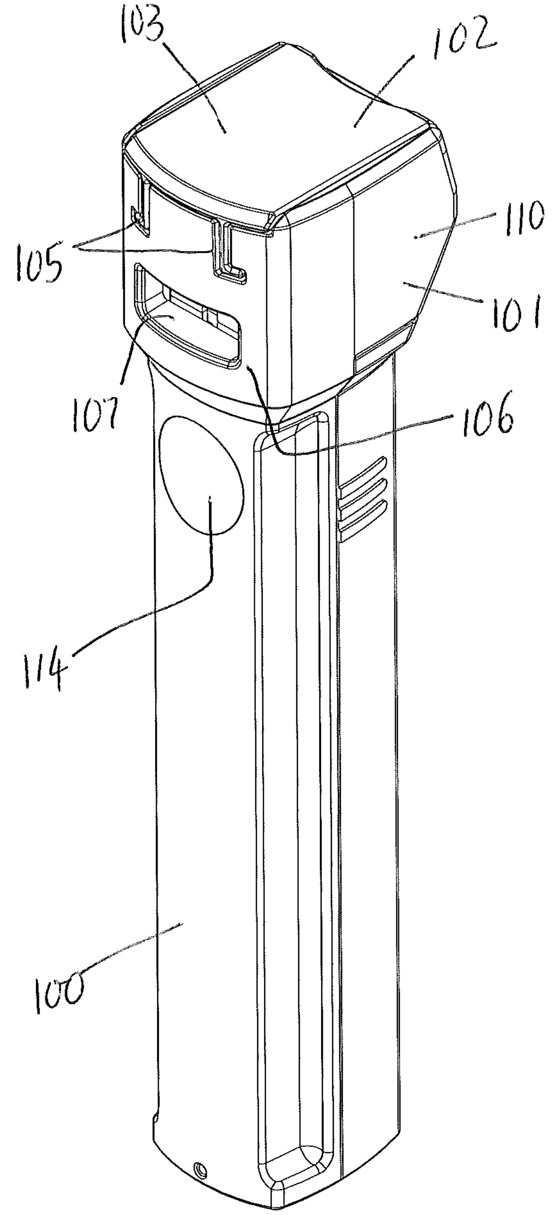
FIG. 9 is a perspective view from the front and to one side of an alternative illumination device deployment apparatus.
Figure 10:
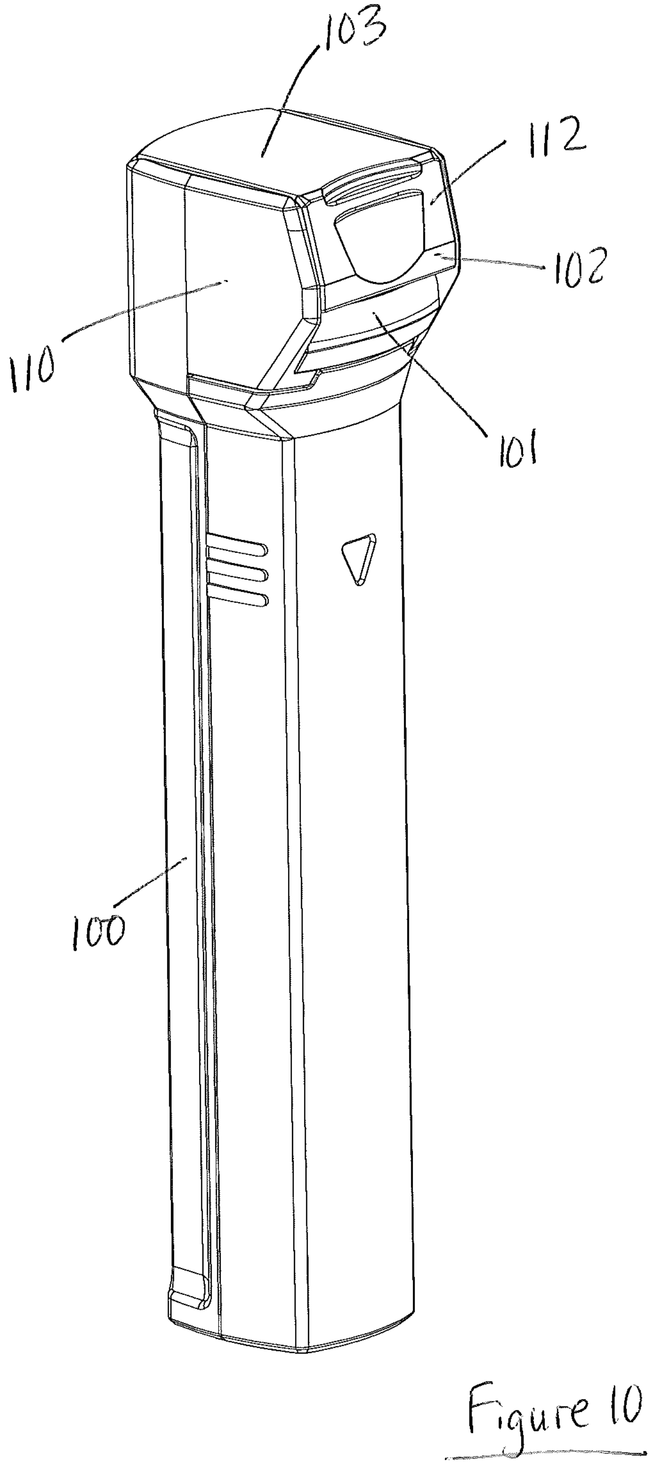
FIG. 10 is a perspective view of the deployment device of FIG. 9 from the rear and to one side.
Figure 11:
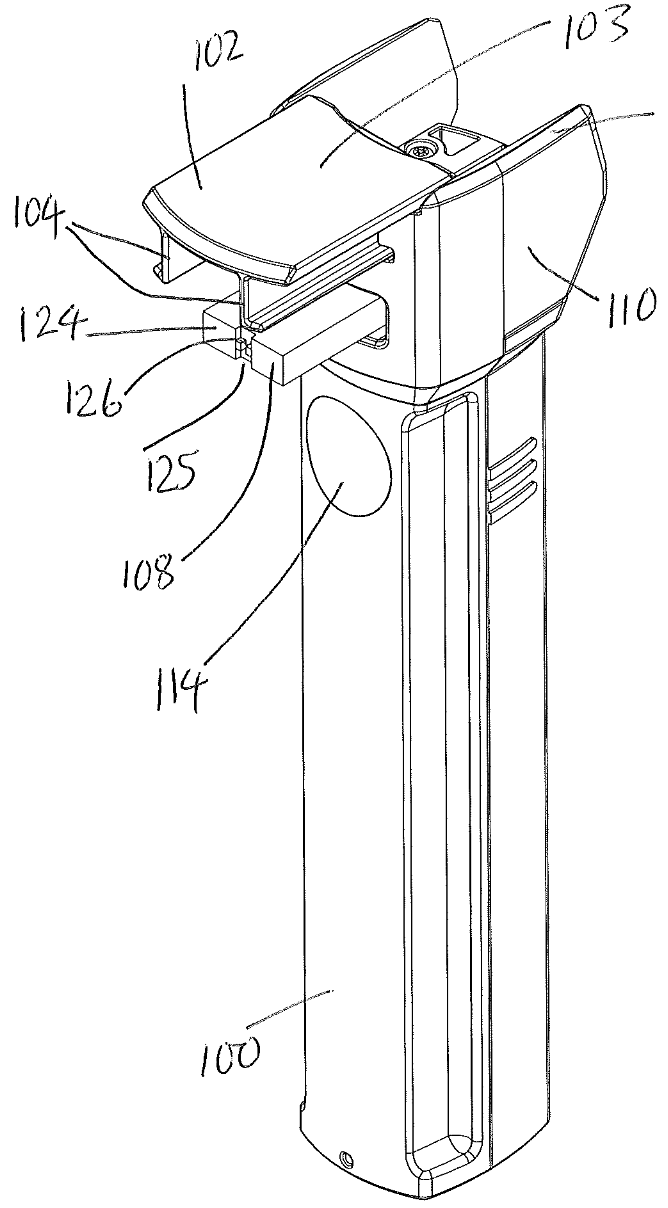
FIG. 11 is a view similar to FIG. 9 showing deployment of an illumination device.
Figure 12:
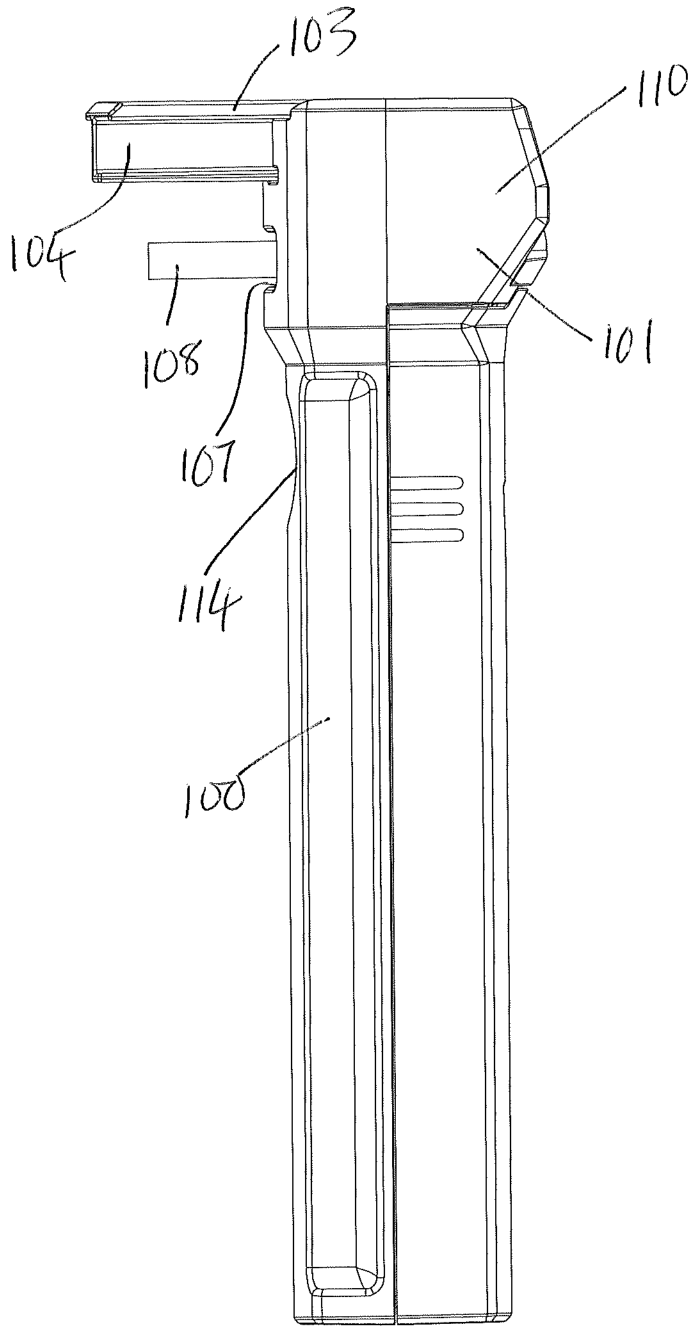
FIG. 12 is a side elevational view of the deployment device in the configuration of FIG. 11 deploying an illumination device.
Figure 13:
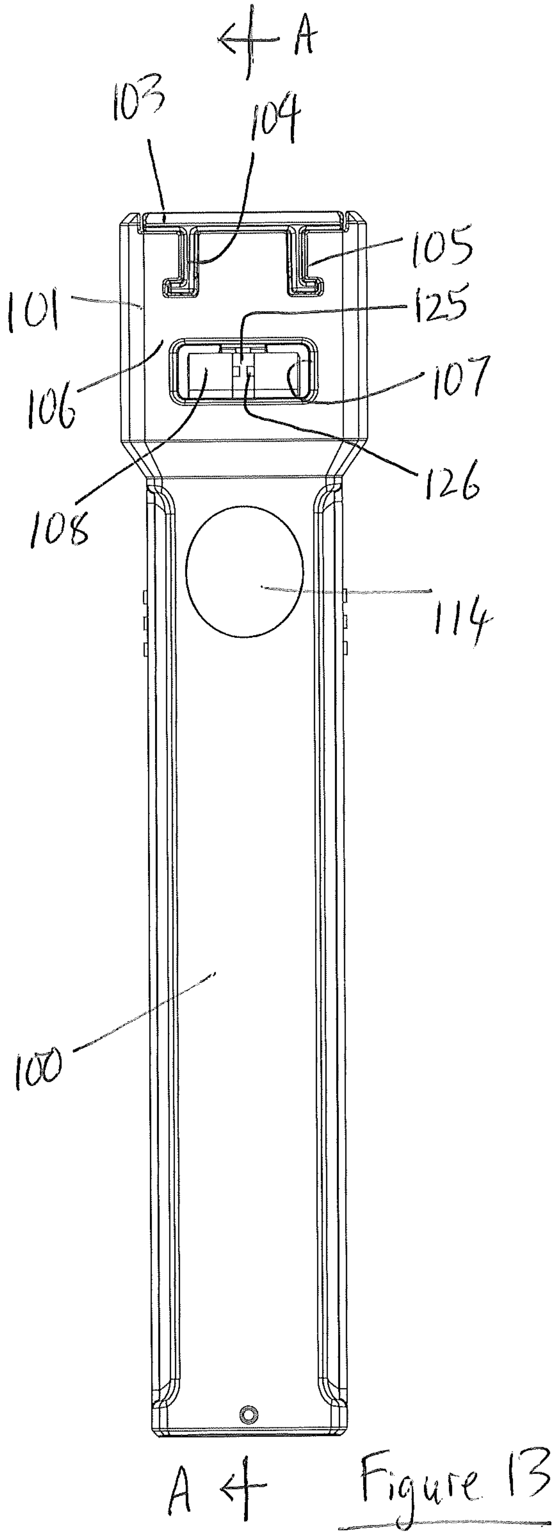
FIG. 13 is a front elevational view of the deployment device of FIGS. 9 to 12.

Cartridge 10 comprises a cartridge casing 11 within which a plurality of illumination devices 1 are mounted and urged by a plate 12 biased by a compression spring 13 to the left in FIGS. 5, 6 and 7 towards cartridge exit 14. Side walls 15 of cartridge 9 have a longitudinally extending through slot 16, and respective abutments 17 on opposite sides of spring plate 12 are located in, slide along and are guided by the slots. Slots 16 also allow a user to engage the spring plate by its abutments 17 and push it to the right in the orientation of FIGS. 6 and 7 while replenishing the cartridge 10 with a fresh supply of illumination devices 1. Cartridge exit 14 provides a through passage 18 with a width corresponding to that of an illumination device and an end wall 19. As best shown in FIG. 5, the leftmost illumination device 1 is urged by the spring loaded plate 12 into the exit passage 18 where it is held against end wall 19 by the force of the compression spring 13 above opening 20 in through passage 18, where it is ready to be ejected from housing 9 by an ejector pin 21 (FIG. 8). Housing 9 has an opening 22 corresponding in position to opening 20 and closed by a flap 23 biased to close opening 22 by a torsion spring 24.

Housing 9 is formed from two main housing components 25 and 26 pivotally coupled by pivot pins 27, and ejector pin 21 is mounted on the inner underside of housing component 25. Squeezing the two housing components together by hand at their leftwards ends in the orientation of FIGS. 4 and 5 to pivot about pivot pins 27 causes ejector pin 21 to engage with illumination device 1 present in exit through passage 18 to push it past spring loaded flap 23 and out of the housing 8. A return compression spring (omitted from FIG. 5 for clarity) has one end located within cylindrical boss 28 on the underside of housing component 25 and its other end located outside cylindrical boss 29 on an internal surface of housing component 26, and serves to return housing components 25 and 26 to their original positions after being squeezed together to deploy an illumination device.

However, in order that the left ends of components 25 and 26 can be squeezed together, a slide member 30 must first be pushed forwardly to the left in FIGS. 4 and 5 to release a portion 31 thereof from a passage 32 between the underside of housing component 25 and an upstanding abutment 33 on housing component 26. It will be appreciated that housing component 26 is essentially hollow to accommodate cartridge casing 11, with an open end closed by cartridge plug 34. Access to cartridge 10 is achieved by removing cartridge plug 34 and depressing one end 35 of a pivotable release lever 36 with a catch 37 at its other end. Cartridge 10 can then be slid out of the open end of the housing 9 for replacement with a fresh cartridge or replenishment with fresh illuminating devices.

Referring to FIG. 8, it will be seen that ejector pin 21 comprises a base 38, with openings 39 allowing it to be mounted to the internal surface of housing component 25, which base has a central projection 40 and two side projections 41 projecting therefrom. Central projection 40 includes metal contacts 42 positioned to engage activation contacts 4 on the illumination device 1 to complete the aforementioned electric circuit to its LEDs. At the same time, side projections 41 of ejection pin 21 extend on either side of the illumination device to engage and open flap 23, enabling the now armed illumination device to be deployed through openings 20 and 22 out of housing 8.

As described hereinabove, the illumination device is armed by a purely mechanical device that completes a circuit between activation contacts on the illumination device to switch on a circuit between the internal battery and one or more LEDs in the illumination device. Alternative arming devices will readily occur to persons skilled in this field in the light of the present teachings, and include an ultraviolet light beam switch, reed switches, pressure switches, the use of visible light and a photo resistor switch, an infrared sensor or a Hall effect magnet sensor.

The illumination device preferably also includes a deactivation system so that it can be turned off after activation. In the embodiment of FIG. 1 this is provided by deactivation contact 5. Making an electric connection between contact 5 and either of the activation contacts 4 switches off the internal circuit connecting the battery with the LEDs. Other forms of deactivation may be employed such as a simple pressure switch.

Other forms of illuminating device are also contemplated and can be deployed by a housing similar to housing 9 utilising a cartridge similar to cartridge 10. In particular, illumination may be provided by chemical rather than electrical means, and specifically by chemiluminescence. In this form of device, arming as the device is deployed may be achieved by breaking a partition separating two chemical reagents which produce light from a chemical reaction between them. The variety of illuminating systems that can be employed in an illumination device in accordance with the teachings of the present disclosure mean that a broad range of devices can be manufactured to meet the needs of customers, with differing light intensities and differing time periods, up to as long as 120 hours, during which they remain operable.

Although cartridge 10 with a supply of illumination devices 1 is mounted in a housing 9 designed to be hand-held in the arrangement illustrated in FIGS. 4 et seq., and illumination devices are deployed by hand from the housing, in this case by squeezing the housing components together, this is not necessary, and other arrangements are contemplated. Thus, a similar cartridge 10 may be mounted in a compartment in or mounted on a vehicle and serving effectively as a housing, and deployment of individual illumination devices from the vehicle may be triggered mechanically or electrically at fixed intervals or at times decided by an operator.

We contemplate that illumination devices may simply be dropped on to the ground, or may include an adhesive pad on a rear surface or exposed by removing a cover to allow the device to be stuck to a surface such as a wall or a tree.

Illumination devices as described herein are particularly useful for search and/or rescue organisations or for use by the military, but they may be used for a variety of different marking or illumination purposes, including, but not limited to illuminating a walkway, a garden or particular features within a garden; use as a directional aid; marking a trail for rescuers in an underground cave system or smoke-filled building; marking a temporary runway, helicopter pad, or drop-zone; or marking a hazard to be avoided such as a minefield or an improvised explosive device; or a safe route through a minefield. Because the illumination need not be in the visible spectrum, the devices can also serve a covert purpose, for example by only being visible to personnel with appropriate night-vision or ultra-violet sights.

FIGS. 9 to 16 show an alternative embodiment of deployment apparatus comprising a housing 100 surmounted by a dispensing head 101. A slider 102 is disposed in the head 101, and comprises flat top 103 with a pair of depending rails 104 that pass through L-shaped slots 105 that are the mirror-image of each other in front face 106 of dispensing head 101. Front face 106 also has a slot 107 through which successive illumination devices 108 are arranged to be dispensed from a store 109 within housing 100. Front face 106 is solid with side pieces 110 of head 101. Slider 102 includes a body 111 that provides rear face 112 of the head 101; and is adapted to slide forwardly of the head 101 between side pieces 110 against the bias of a helical spring 113 (FIG. 14), which is mounted between body 111 and the rear of front face 106, when slider 102 is pushed at rear face 112.

Housing 100 is sized to fit comfortably in the grasp of a user's hand so that slider 102 can be pushed forwardly by the thumb of that hand. A shallow detent 114 is provided on front face 115 of housing 100 for locating the index finger of the user's hand. When thumb pressure against rear face 112 of the slider is released, spring 113 returns the slider 102 to its original position.

Figure 14:
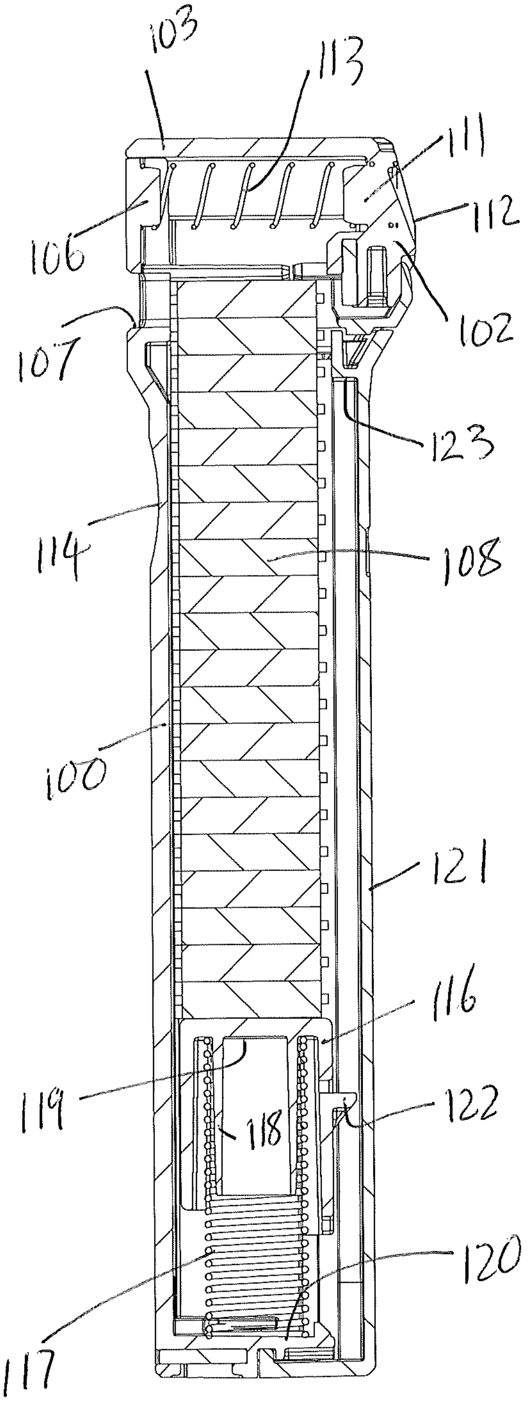
FIG. 14 is a sectional view of the deployment device of FIGS. 9 to 13 taken along the line A-A in FIG. 13 with the deployment device in the configuration of FIGS. 9 and 10.
Figure 15:
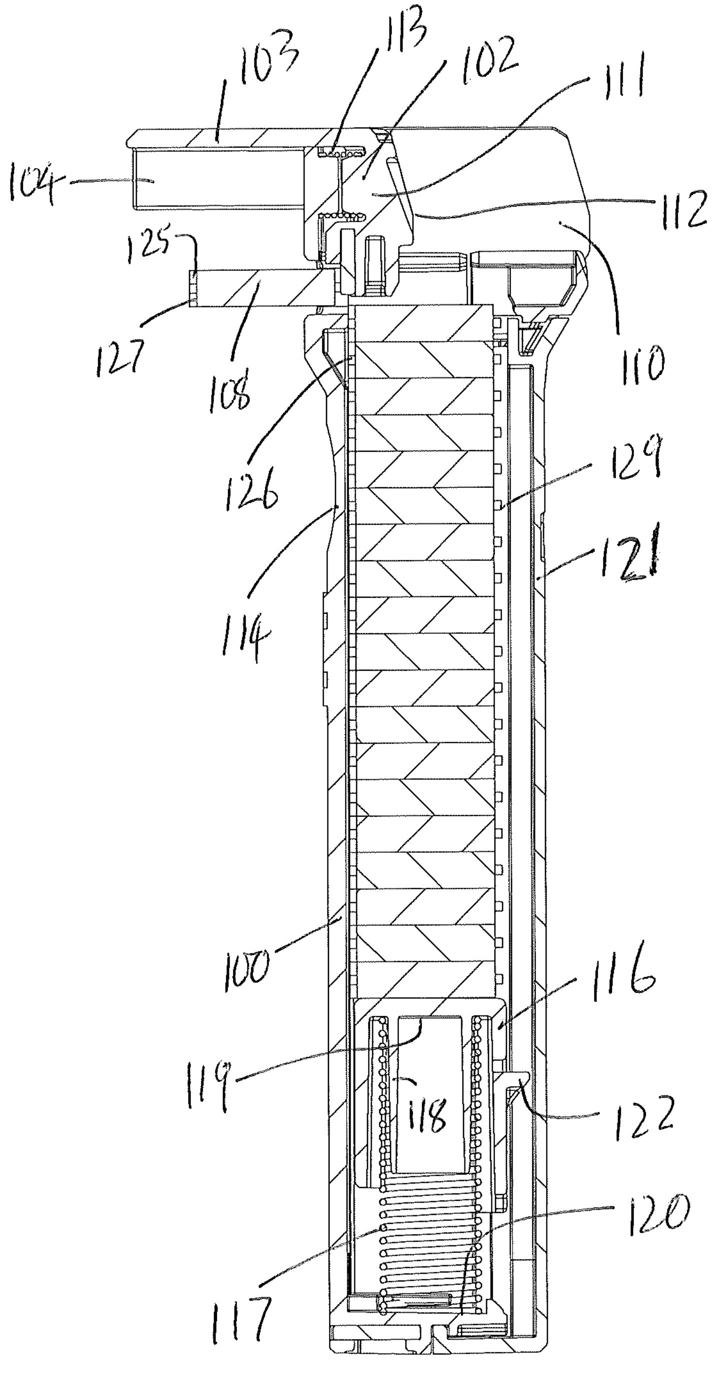
FIG. 15 is a sectional view of the deployment device of FIGS. 9 to 13 also taken along the line A-A in FIG. 13, but with the deployment device in the configuration of FIGS. 11 and 12.
Figure 16:
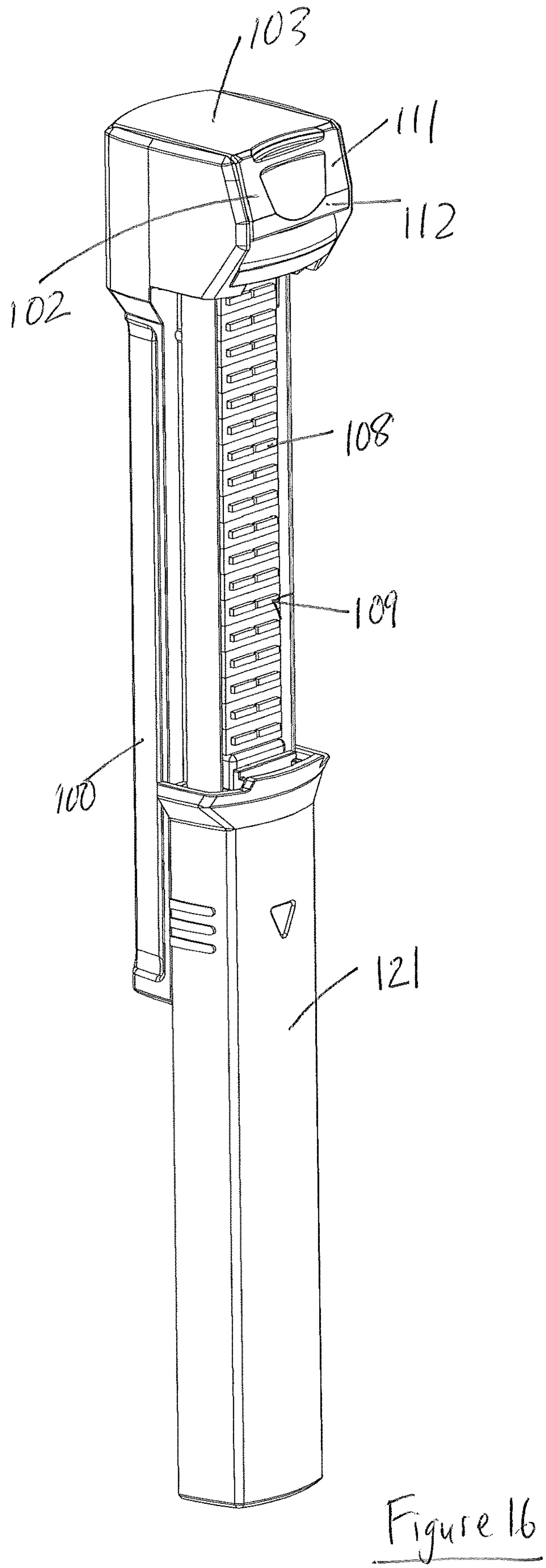
FIG. 16 shows a perspective view of the deployment device of FIGS. 9 to 15 from the rear and to one side as in FIG. 10 but with a rear portion of a housing of the device slid to an open position.

As can be seen from the sectional views of FIGS. 14 and 15, illumination devices 108 are stacked on top of each other within store 109 and urged towards the dispensing head 101 by a carriage 116 slidably positioned within housing 100. Carriage 116 is biased by a helical spring 117 mounted about a depending cylinder 118 on underside 119 of the carriage 116 between that underside 119 and base 120 of housing 100. The rear of housing 101 is provided with a cover 121 slidable away from the head 101 as shown in FIG. 16 to allow access to the interior of the housing. Carriage 116 has a projection 122 to the rear which is engageable by an internal surface 123 of the cover 121 when the cover is fully slid down as shown in FIG. 16. Thus, while the cover 121 is held at its lowermost position, the carriage is prevented from sliding towards the head 101, thereby enabling illumination devices 108 to be inserted into or withdrawn from the store 109.

The illumination devices 108 differ slightly from the embodiments illustrated in FIGS. 1 to 3. Forward end 124 of each illumination device 108 includes a slot 125 with respective pins 126 extending from sidewalls 127 into the slot. Rear end 128 of each illumination device 108 has two pins 129 extending to the rear. When slider 102 is biased to its rearmost position in the head 101 by spring 113 a metal surface portion 130 on forward face 131 of body 110 is held out of contact with pins 129.

As slider 102 is pushed forwardly metal surface portion 130 makes electrical contact with both of the rearwardly extending pins 129 of the confronting illumination device 108, completing a circuit within that illumination device 108 to change it from a first pre-operative state in which it is inoperative but ready for use to a second state in which it provides illumination. Thus, the illumination device 108 is moved from the store 109 inside housing 100 through a passage from the top of the store and through slot 107 in front face 106 of head 101 to emerge from slot 107 in its illumination condition. As slider 102 retreats towards its original position as pressure against it is released and the bias of spring 113 within the head 101 operates, the remaining illumination devices 108 in store 109 move upwardly by one iteration as a column pushed by carriage 116 under the influence of spring 117.

The above procedure is repeated for successive illumination devices 108 each time slider 102 is operated.

Making an electrical connection in a deployed illumination device between pins 126, otherwise physically shielded by location within slot 125, switches off that illumination device.

As an alternative, as with previously described embodiments according to other aspects of this disclosure, illumination devices used in this embodiment may provide illumination by chemical, and specifically by chemiluminescent means as opposed to electrical means.

Moreover, the illumination devices 108 can be employed in all the same ways as the previously described devices.

The invention claimed is:

1. An illumination device deployment apparatus comprising: a housing adapted to store a plurality of identical self-contained illumination devices in a stack thereof; the housing being coupled to a dispensing head for dispensing successive illumination devices from the stack through a common passage to the exterior; the dispensing head including a slider adapted, against the bias of a return spring, to push a said illumination device from an end-most position of the stack through said common passage to the exterior; each illumination device having a first pre-operative state in which it is inoperative but ready for use and a second state in which it is operative to provide illumination at at least one frequency within the range from and including infrared to and including ultraviolet, the device being in said first state when within said stack; and the slider when in contact with an illumination device to push it from the said end-most position through said passage to the exterior, being operative to change the state of the illumination device from its first to its second state.

2. A deployment apparatus according to claim 1, wherein the slider includes a metal surface portion adapted to make an electrical connection between two opposed pins on a confronting surface of the illumination device, thereby switching the illumination device on, when the slider makes contact with the illumination device at said end-most position of the stack when pushing it through the passage to the exterior.

3. A deployment device according to claim 1, further comprising a bias spring within the housing adapted to urge illumination devices in said stack towards said end-most position in a direction at right angles to the direction of movement of the slider.

4. A deployment apparatus according to claim 1, sized and configured for use in one hand, with that hand grasping the housing about its length while the thumb of that same hand pushes the slider forwardly.

5. A deployment apparatus according to claim 1, wherein the housing is provided with a slidable cover capable of being slid to an open condition to reveal the stack, and wherein the bias of the bias spring is transmitted to illumination devices in said stack via a carriage slidable within the housing and operable to engage with the stack it its end opposite said end-most position; the carriage including a projection positioned for contact by a portion of said cover to allow the bias of the bias spring to be disengaged from the stack by holding the slidable cover open, to thereby allow illumination devices to be added to or removed from the stack.

6. A method for marking a line or laying a trail, the method comprising operating a deployment apparatus according to claim 1 at intervals, while following the line or trail, which intervals need not be the same, to thereby deploy individual self-contained illumination devices from said deployment apparatus, the individual self-contained illumination devices being changed from their first pre-operative state to their second state, in which they are operative to provide illumination at at least one frequency within the range from and including infrared to and including ultraviolet, in the course of movement through said common passage to the exterior.

* * * * *